United States Patent
Zhu et al.

(10) Patent No.: US 8,495,022 B1
(45) Date of Patent: Jul. 23, 2013

(54) SYSTEMS AND METHODS FOR SYNTHETIC BACKUPS

(75) Inventors: Baishen Zhu, Sanford, FL (US); Ynn-Pyng Anker Tsaur, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 383 days.

(21) Appl. No.: 12/779,574

(22) Filed: May 13, 2010

(51) Int. Cl.
*G06F 7/00* (2006.01)
*G06F 17/00* (2006.01)

(52) U.S. Cl.
USPC .......................................................... 707/645

(58) Field of Classification Search
None
See application file for complete search history.

(56) References Cited

U.S. PATENT DOCUMENTS

| | | | |
|---|---|---|---|
| 7,756,833 B2 * | 7/2010 | Van Ingen et al. | 707/640 |
| 8,099,572 B1 * | 1/2012 | Arora et al. | 711/162 |
| 2007/0022145 A1 * | 1/2007 | Kavuri | 707/204 |
| 2011/0125714 A1 * | 5/2011 | Manson | 707/645 |
| 2011/0161297 A1 * | 6/2011 | Parab | 707/646 |
| 2012/0143835 A1 * | 6/2012 | Aronovich et al. | 707/696 |

* cited by examiner

*Primary Examiner* — Cheryl Lewis
*Assistant Examiner* — Raheem Hoffler
(74) *Attorney, Agent, or Firm* — ALG Intellectual Property, LLC

(57) ABSTRACT

A computer-implemented method for synthetic backups may include identifying a full backup of a volume of files. The computer-implemented method may also include identifying a set of incremental backups that were performed subsequently to the full backup. The computer-implemented method may further include identifying a set of storage devices that store the full backup and the set of incremental backups. The computer-implemented method may additionally include identifying a request to create a synthetic backup incorporating the full backup and the set of incremental backups. The computer-implemented method may moreover include generating a sorted catalog for the synthetic backup by indexing files for the synthetic backup in an order based on at least one characteristic of the files. The computer-implemented method may also include creating the synthetic backup of the indexed files in the sorted catalog by reading the indexed files in an order based on locations of the indexed files on the set of storage devices. Various other methods, systems, and computer-readable media are also disclosed.

20 Claims, 7 Drawing Sheets

SYSTEMS AND METHODS FOR SYNTHETIC BACKUPS

BACKGROUND

In the digital age, organizations increasingly rely on digitally-stored data. To protect against data loss, an organization may use a backup system to back up important data. In order to reduce the resources required to perform each backup, the backup system may perform a full backup of the data, followed by incremental backups capturing changes to the data since the last backup.

Restoring data for a system using incremental backups may require applying changes recorded in one or more incremental backups to data in a full backup. In order to improve performance and/or reduce resource consumption, some backup systems may periodically consolidate the most recent full backup and all subsequent incremental backups into a synthetic backup (e.g., an up-to-date full backup constructed from existing backup data).

Unfortunately, traditional synthetic backup systems may suffer from a variety of limitations and/or performance issues. For example, some synthetic backup systems may produce a full synthetic backup image with files in a sorted order (e.g., as a full backup performed by the backup system would be). However, to write the files to the synthetic backup in sorted order, such a synthetic backup system may have to read the files from backup storage devices in a non-sequential order. This approach may make the use of sequential storage devices (e.g., tape storage) impractical.

Conversely, some synthetic backup systems may read the files for the full synthetic backup image sequentially from the backup storage devices. However, this may result in these synthetic backup systems producing a synthetic backup image with files in an unsorted order. In such cases, subsequent synthetic backups may require more time and resources as searching through an unsorted list of files of an old synthetic backup when creating a new synthetic backup may be less efficient.

SUMMARY

As will be described in greater detail below, the instant disclosure generally relates to systems and methods for synthetic backups. Embodiments of the instant disclosure may create a synthetic backup from a full backup and one or more subsequent incremental backups by creating sorted catalog of files for the synthetic backup but reading the files (e.g., for writing to the synthetic backup) in an order based on the location of the files on one or more storage devices. For example, a method may include identifying a full backup of a volume of files, identifying a set of incremental backups that were performed subsequently to the full backup, identifying a set of storage devices that store the full backup and the set of incremental backups, identifying a request to create a synthetic backup incorporating the full backup and the set of incremental backups, generating a sorted catalog for the synthetic backup by indexing files for the synthetic backup in an order based on at least one characteristic of the files, and then creating the synthetic backup of the indexed files in the sorted catalog by reading the indexed files in an order based on locations of the indexed files on the set of storage devices.

The method may be performed in a variety of contexts. For example, the full backup may include a previous synthetic backup. In some examples, the set of storage devices may include at least one sequential access storage device.

Identifying the various backups may include identifying metadata related to these backups. For example, identifying the full backup may include identifying a sorted catalog of files in the full backup. Additionally or alternatively, identifying the set of incremental backups may include identifying a sorted catalog of files for each incremental backup in the set of incremental backups.

Indexing the files for the synthetic backup may include a variety of approaches. For example, indexing the files for the synthetic backup may include indexing the files in a lexicographical order. Additionally or alternatively, indexing the files for the synthetic backup may include indexing the files in an order used by the file system of the volume of files. In some examples, indexing the files for the synthetic backup may include indexing the files in an order independent from an order in which the indexed files are to be stored in the synthetic backup. In various examples, the characteristic of the files may be sufficient to determine a well-ordering of the files.

Reading the indexed files in an order based on locations of the indexed files on the set of storage devices may include a variety of steps. For example, reading the indexed files may include grouping reads of the indexed files by storage device. Additionally or alternatively, reading the indexed files may include ordering reads of indexed files stored on a sequential access device in a sequential access order.

In some examples, a system for synthetic backups may include an identification module, a cataloguing module, and a backup module. The identification module may be programmed to identify a full backup of a volume of files, identify a set of incremental backups that were performed subsequently to the full backup, identify a set of storage devices that store the full backup and the set of incremental backups, and identify a request to create a synthetic backup incorporating the full backup and the set of incremental backups. The cataloguing module may be programmed to generate a sorted catalog for the synthetic backup by indexing files for the synthetic backup in an order based on at least one characteristic of the files. The backup module may be programmed to create the synthetic backup of the indexed files in the sorted catalog by reading the indexed files in an order based on locations of the indexed files on the set of storage devices.

The system may operate in a variety of contexts. For example, the full backup may include a previous synthetic backup. In some examples, the set of storage devices may include at least one sequential access storage device.

The identification module may also identify metadata related to the various backups. For example, the identification module may identify a sorted catalog of files in the full backup as part of identifying the full backup. Additionally or alternatively, the identification module may identify a sorted catalog of files for each incremental backup in the set of incremental backups as part of identifying the set of incremental backups.

The cataloguing module may index the files for the synthetic backup using a variety of approaches. For example, the cataloguing module may index the files for the synthetic backup by indexing the files in a lexicographical order. Additionally or alternatively, the cataloguing module may index the files for the synthetic backup by indexing the files in an order used by the file system of the volume of files. In some examples, the cataloguing module may index the files for the synthetic backup by indexing the files in an order independent from an order in which the indexed files are to be stored in the synthetic backup. In various examples, the characteristic of the files is sufficient to determine a well-ordering of the files.

The backup module may read the indexed files in an order based on locations of the indexed files on the set of storage devices using a variety of steps. For example, the backup module may read the indexed files by grouping reads of the indexed files by storage device. Additionally or alternatively, the backup module may read the indexed files by ordering reads of indexed files stored on a sequential access device in a sequential access order.

In some embodiments, a computer-readable-storage medium may include one or more computer-executable instructions that, when executed by at least one processor of a computing device, cause the computing device to identify a full backup of a volume of files, identify a set of incremental backups that were performed subsequently to the full backup, identify a set of storage devices that store the full backup and the set of incremental backups, identify a request to create a synthetic backup incorporating the full backup and the set of incremental backups, generate a sorted catalog for the synthetic backup by indexing files for the synthetic backup in an order based on at least one characteristic of the files, and then create the synthetic backup of the indexed files in the sorted catalog by reading the indexed files in an order based on locations of the indexed files on the set of storage devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
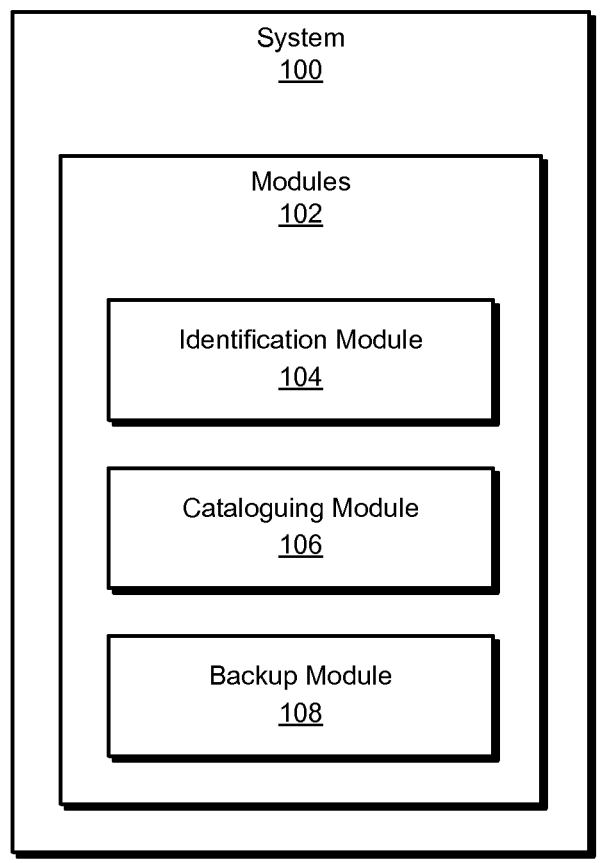
FIG. 1 is a block diagram of an exemplary system for synthetic backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for synthetic backups. Systems and methods described herein may create a synthetic backup from a full backup and one or more subsequent incremental backups by creating sorted catalog of files for the synthetic backup but reading the files (e.g., for writing to the synthetic backup) in an order based on the location of the files on one or more storage devices. By creating a sorted catalog of files, subsequent synthetic backups may be prepared more efficiently. Furthermore, by reading the files in an order based on the locations of the files (e.g., by reading the files in sequential order from each storage device), systems and methods described herein may create the synthetic backup from backups stored on sequential storage devices and/or may perform the synthetic backup more efficiently (e.g., by reducing costly seek operations).

Figure 2:
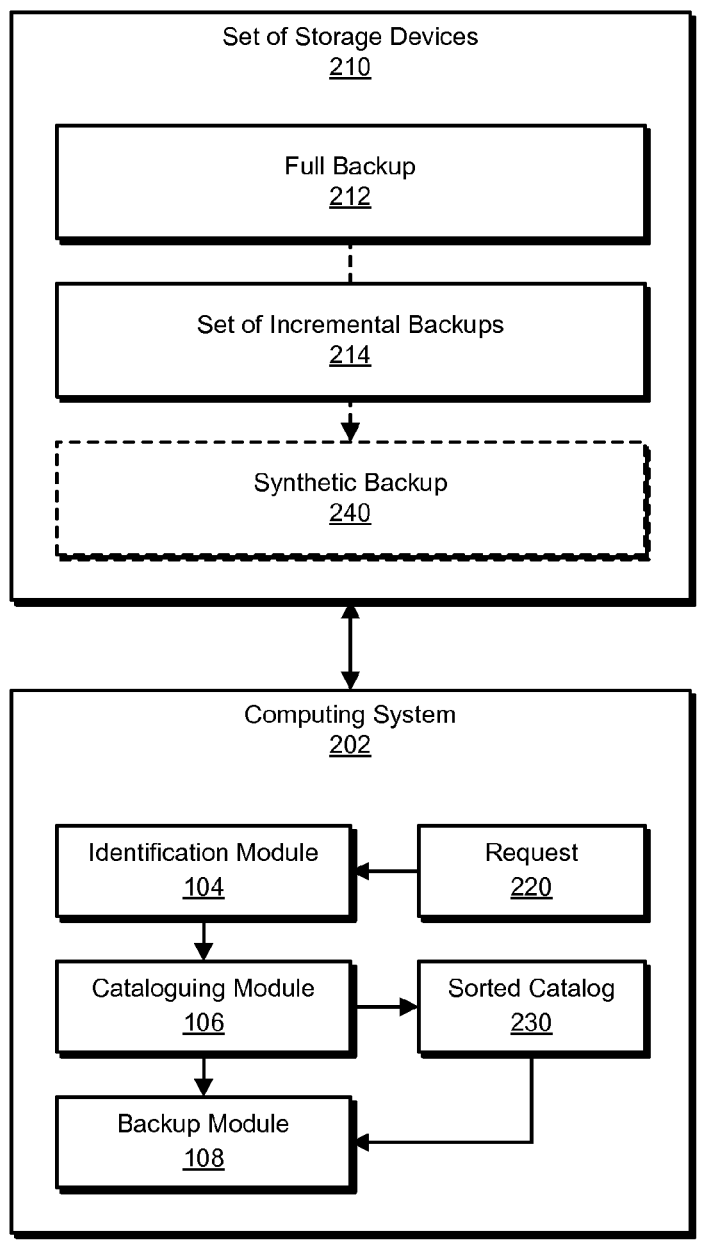
FIG. 2 is a block diagram of an exemplary system for synthetic backups.

The following will provide, with reference to FIGS. 1-2, detailed descriptions of exemplary systems for synthetic backups. Detailed descriptions of corresponding computer-implemented methods will also be provided in connection with FIG. 3. The following will also provide detailed descriptions of exemplary synthetic backups in process with reference to FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for synthetic backups. As illustrated in this figure, exemplary system 100 may include one or more modules 102 for performing one or more tasks. For example, and as will be explained in greater detail below, exemplary system 100 may include a identification module 104 programmed to identify a full backup of a volume of files, identify a set of incremental backups that were performed subsequently to the full backup, identify a set of storage devices that store the full backup and the set of incremental backups, and identify a request to create a synthetic backup incorporating the full backup and the set of incremental backups. Exemplary system 100 may also include a cataloguing module 106 programmed to generate a sorted catalog for the synthetic backup by indexing files for the synthetic backup in an order based on at least one characteristic of the files.

In addition, and as will be described in greater detail below, exemplary system 100 may include a backup module 108 programmed to create the synthetic backup of the indexed files in the sorted catalog by reading the indexed files in an order based on locations of the indexed files on the set of storage devices. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 with access to a set of storage devices 210. The set of storage devices 210 may store a full backup 212 and a set of incremental backups 214. In one embodiment, and as will be described in greater detail below, computing system 202 may include an identification module 104, a cataloguing module 106, and a backup module 108.

Identification module 104 may be programmed to identify a full backup of a volume of files. For example, identification module 104 may identify full backup 212 in FIG. 2. Identification module 104 may also be programmed to identify a set of incremental backups that were performed subsequently to the full backup. For example, identification module 104 may identify incremental backups 214.

Identification module 104 may additionally be programmed to identify a set of storage devices that store the full backup and the set of incremental backups. For example, identification module 104 may be programmed to identify storage devices 210. Identification module 104 may further be programmed to identify a request to create a synthetic backup incorporating the full backup and the set of incremental backups. For example, identification module 104 may identify a request 220.

Cataloguing module 106 may be programmed to generate a sorted catalog for the synthetic backup by indexing files for the synthetic backup in an order based on at least one characteristic of the files. For example, cataloguing module 106 may be programmed to generate a sorted catalog 230.

Backup module 108 may be programmed to create the synthetic backup of the indexed files in the sorted catalog by reading the indexed files in an order based on locations of the indexed files on the set of storage devices. For example, backup module 108 may create a synthetic backup 240 (e.g., on one or more of storage devices 210).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Storage devices 210 generally represent any type or form of storage device that is capable of storing backup data. Examples of storage devices 210 include, without limitation, magnetic tape drives, magnetic disk drives, optical disk drives, solid state drives, or the like.

Figure 3:
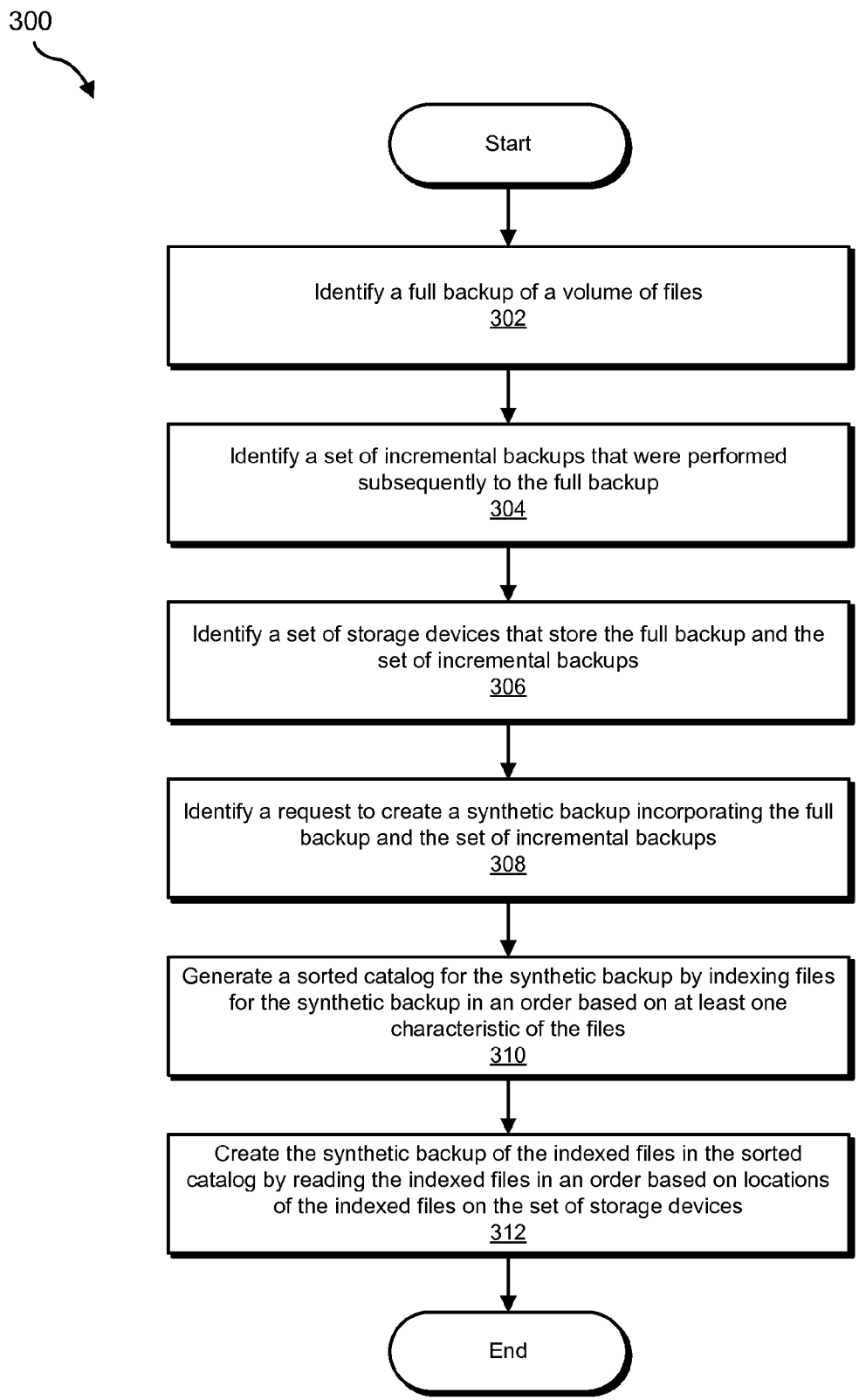
FIG. 3 is a flow diagram of an exemplary method for synthetic backups.

FIG. 3 is a flow diagram of an exemplary computer-implemented method 300 for synthetic backups. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a full backup of a volume of files. For example, at step 302 identification module 104 may, as part of computing system 202 in FIG. 2, identify full backup 212. As used herein the term "file" may refer to any unit of data that may be backed up, such as a file system object (e.g., a file, a directory, etc.). Likewise, the term "volume" may refer to any collection of files that may be backed up (e.g., a complete drive or volume, a group of files and/or directories designated for backup, etc.).

Additionally, as used herein, the phrase "full backup" may refer to any backup of data capable of representing all of the data without reference to any other backup. In some examples, the full backup may include a previous synthetic backup. For example, systems and methods described herein may periodically create a synthetic backup from a full backup and one or more incremental backups. Whenever a synthetic backup is created, the various systems described herein may use the newly created synthetic backup as a full backup to form the basis for a subsequent synthetic backup.

Identification module 104 may identify the full backup in any suitable manner. For example, identification module 104 may read a configuration file identifying the full backup. Additionally or alternatively, identification module 104 may identify the full backup by looking up the location of the full backup. In some examples, identification module 104 may identify the full backup by receiving a message identifying the full backup.

In some examples, identification module 104 may identify a sorted catalog of files in the full backup (e.g., as part of identifying the full backup). As used herein, the term "catalog" may refer to any catalog, list, inventory, and/or data structure capable of referencing and/or keeping track of files in backups. For example, the sorted catalog of files in the full backup may include a list of files (e.g. filenames with full paths), locations of the files (e.g., logical block addresses), and/or sizes of the files. The sorted catalog may be sorted according to any suitable order. For example, the list of files may be totally ordered lexicographically. As will be explained in greater detail below, by identifying the sorted catalog for the full backup the systems and methods described herein may more efficiently create a sorted catalog for a synthetic backup.

Figure 4:
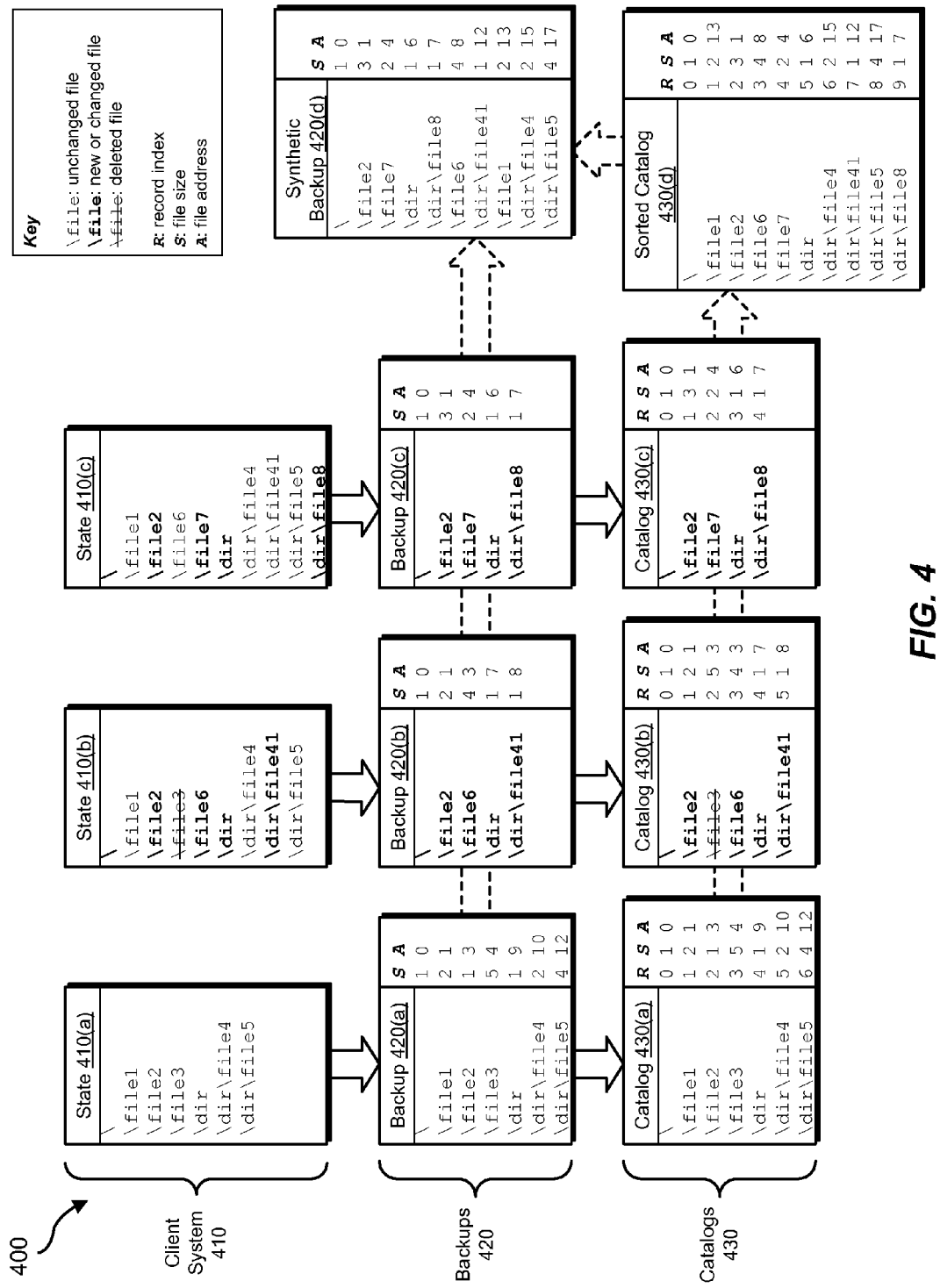
FIG. 4 is a block diagram of an exemplary synthetic backup process.

To provide an example to illustrate elements step 302, FIG. 4 shows an exemplary synthetic backup process 400. As shown in FIG. 4, a client system 410 may undergo backups 420. The client system 420 may be in states 410(a), 410(b), and 410(c) at the times of backups 420(a), 420(b), and 420(c), respectively. Backup 420(a) may represent a full backup of the client system 410. Catalog 430(a) may represent a sorted catalog of the full backup. In one example, identification module 104 may identify backup 420(a) along with catalog 430(a).

Returning to FIG. 3, at step 304 one or more of the systems described herein may identify a set of incremental backups that were performed subsequently to the full backup. For example, at step 304 identification module 104 may, as part of computing system 202 in FIG. 2, identify the set of incremental backups 214. Using FIG. 4 as another example, identification module 104 may identify backups 420(b) and 420(c).

As used herein, the term "set" may refer to any collection of any size. In some examples, the term "set" may refer to a collection with only one member. For example, identification module 104 may identify one incremental backup. As used herein, the phrase "incremental backup" may refer to any backup adding to, building on, and/or referring to one or more previous backups.

Identification module 104 may identify the set of incremental backups in any suitable manner. For example, identification module 104 may read a configuration file identifying the set of incremental backups. Additionally or alternatively, identification module 104 may identify the set of incremental backups by looking up the locations of incremental backups in the set of incremental backups. In some examples, identification module 104 may identify the set of incremental backups by receiving a message identifying the set of incremental backups.

In some examples, identification module 104 may identify a sorted catalog of files for each incremental backup in the set of incremental backups (e.g., as part of identifying the set of incremental backups). A sorted catalog for an incremental backup may include any feature as described earlier with reference to the sorted catalog for the full backup. For example, the sorted catalog may include a list of files (e.g. filenames with full paths), locations of the files (e.g., logical block addresses), and/or sizes of the files. The sorted catalog may be sorted according to any suitable order. For example, the list of files may be totally ordered lexicographically. As will be explained in greater detail below, by identifying a sorted catalog for each incremental backup in the set of incremental backups, the systems and methods described herein may more efficiently create a sorted catalog for a synthetic backup. As an example, FIG. 4 shows catalogs 430(b) and 430(c) associated with backups 420(b) and 430(c), respectively. In one example, identification module 104 may identify backups 420(b) and 420(c) along with catalogs 430(b) and 430(c).

Returning to FIG. 3, at step 306 one or more of the systems described herein may identify a set of storage devices that store the full backup and the set of incremental backups. For example, at step 306 identification module 104 may, as part of computing system 202 in FIG. 2, identify the set of storage devices 210.

Identification module 104 may perform step 306 in any suitable manner. For example, identification module 104 may identify the set of storage devices by reading from a configuration file. Additionally or alternatively, identification module 104 may identify the set of storage devices by receiving a message identifying the set of storage devices. In some examples, identification module 104 may identify the set of storage devices as a part of identifying the full backup and/or identifying the set of incremental backups.

The set of storage devices may include any storage device suitable for storing at least a portion of a backup. For example, the set of storage devices may include at least one sequential access device, such as a tape drive. As will be described in greater detail below, the systems and methods described herein may more efficiently and effectively read from a sequential access device while creating the synthetic backup by ordering reads in accordance with the location of each read target on the sequential access device. In some examples, by identifying the sequential access device the systems and methods described herein may ensure that reads are ordered accordingly.

At step 308 one or more of the systems described herein may identify a request to create a synthetic backup incorporating the full backup and the set of incremental backups. For example, at step 308 identification module 104 may, as part of computing system 202 in FIG. 2, identify request 220.

Identification module 104 may perform step 308 in any suitable manner. For example, identification module 104 may identify the request by receiving a message including the request. Additionally or alternatively, identification module 104 may identify the request by reaching an appointed time on a synthetic backup schedule. In some examples, identification module 104 may identify the request simply by executing instructions for creating a synthetic backup.

At step 310 one or more of the systems described herein may generate a sorted catalog for the synthetic backup by indexing files for the synthetic backup in an order based on at least one characteristic of the files. For example, at step 310 cataloguing module 106 may, as part of computing system 202 in FIG. 2, generate sorted catalog 230.

Cataloguing module 106 may generate the sorted catalog in a number of ways. For example, cataloguing module 106 may generate the sorted catalog by reading, modifying, and/or combining catalogues for the full backup and/or the set of incremental backups. For example, cataloguing module 106 may start with a sorted catalog for the full backup and insert, delete, and/or modify entries to the catalog based on catalogues for the set of incremental backups.

Cataloguing module 106 may index the files for the synthetic backup may using a variety of approaches. For example, cataloguing module 106 may index the files for the synthetic backup in a lexicographical order. For example, cataloguing module 106 may identify an ordered set of characters (e.g., "[0-9][A-Z][a-z]") and order files for the synthetic backup by filename according to the lexicographical order as defined by the ordered set of characters. Additionally or alternatively, cataloguing module 106 may index the files for the synthetic backup in an order used by a file system of the volume of files (e.g., a file system used to access the volume of files, a file system used to back up the volume of files, etc.). For example, cataloguing module 106 may index the files in a hierarchical order (e.g., starting from a root directory and then descending into subdirectories, either breadth-first or depth-first). In some examples, cataloguing module 106 may use a combination of approaches (e.g., indexing files in hierarchical order, using lexicographical order within a directory in the hierarchy). In certain examples, cataloguing module 106 may index the files for the synthetic backup in an order used for full backups.

Generally, cataloguing module 106 may use any suitable characteristic of the files to determine the order when indexing the files. For example, the characteristic of the files may be sufficient to determine a well-ordering of the files. There may accordingly exist a bijective mapping of the characteristic of the files (e.g., a full path of each file) to a well-ordered set of the files. Such a well-ordered set may represent the order of the files as indexed by cataloguing module 106. In some alternative examples, the characteristic of the files may only be sufficient to determine a total-ordering of the files. In these examples, cataloguing module 106 may index the files in a total order (e.g., into a sorted index with internally unsorted buckets).

In various examples, cataloguing module 106 may index the files for the synthetic backup using an order independent from an order in which the indexed files are to be stored in the synthetic backup. For example, the order of files in the sorted catalog of the synthetic backup may differ from the eventual order of files in the synthetic backup itself. By not tying the order of the files in the sorted catalog of the synthetic backup to the order of the files as stored on a storage device in the synthetic backup, systems and methods described herein may perform reads from the set of storage devices in efficient sequences while maintaining a sorted catalog for efficient future catalog generation.

Using FIG. 4 as an example, cataloguing module 106 may generate a sorted catalog 430(d) using information from catalogs 430(a)-(c). For example, catalog 430(a) may index files in backup 420(a) in a hierarchical-lexicographical order (e.g., starting from the root directory "\", all of the files therein in lexicographical order, and then the directory "\dir" and the files therein in lexicographical order). Cataloguing module 106 may incorporate changes indicated by catalogues 430(b)-(c) by removing deleted files (such as "\ file3"), inserting new files (such as "\ file6") in order, and modifying the identified size of changed files (such as "\file2", which changed size from "1" to "2" to "3" through states 410(a)-(c)). However, as mentioned earlier and as will be discussed in greater detail below, the file addresses (e.g., logical block addresses) of the files indexed in sorted catalog 430(d) may be out of order (e.g., "\" is to be stored at "0", "\ file1" is to be stored at "13", "\file2" is to be stored at "1", etc.).

Returning to FIG. 3, at step 312 one or more of the systems described herein may create the synthetic backup of the indexed files in the sorted catalog by reading the indexed files in an order based on locations of the indexed files on the set of storage devices. For example, at step 312 backup module 108 may, as part of computing system 202 in FIG. 2, create synthetic backup 240 by reading the indexed files in sorted catalog 230 in an order based on the locations of the indexed files on set of storage devices 210.

Backup module 108 may create the synthetic backup in any suitable manner. In some examples, backup module 108 may write the synthetic backup to a backup storage device (e.g., a storage device in the set of storage devices).

Backup module 108 may read the indexed files in a variety of orders. For example, backup module 108 may group reads of the indexed files by storage device. In this example, backup module 108 may read each indexed file from a storage device before reading from another storage device. Additionally or alternatively, backup module 108 may order reads of indexed files stored on a sequential access device in a sequential access order. For example, backup module 108 may order reads so as to minimize and/or eliminate backtracking, skipping, and/or any other non-sequential seeking on the sequential access device. In some examples, backup module 108 may combine approaches (e.g., backup module 108 may read each indexed file from a storage device before reading from another storage device and may read the indexed files in the order in which they are stored on each storage device).

Using FIG. 4 as an example, each of backups 420(a)-(c) may be stored on a separate storage device. Backup module 108 may accordingly read from each storage device in turn (e.g., reading files needed from backup 420(c), then backup 420(b), then backup 420(a)). For example, backup module 108 may read (and copy) the following files and directories from backup 420(c) in order:

\
\file2
\file7
\dir
\file8 backup module 108 may then read and copy the following files from backup 420(b) in order:

\file6
\dir\file41 backup module 108 may then read and copy the following files from backup 420(a) in order:

\file1
\dir\file4
\dir\file5 after which backup module 108 will have copied all files and directories needed to create the synthetic backup 420(d) representing state 410(c) of client system 410.

Figure 5:
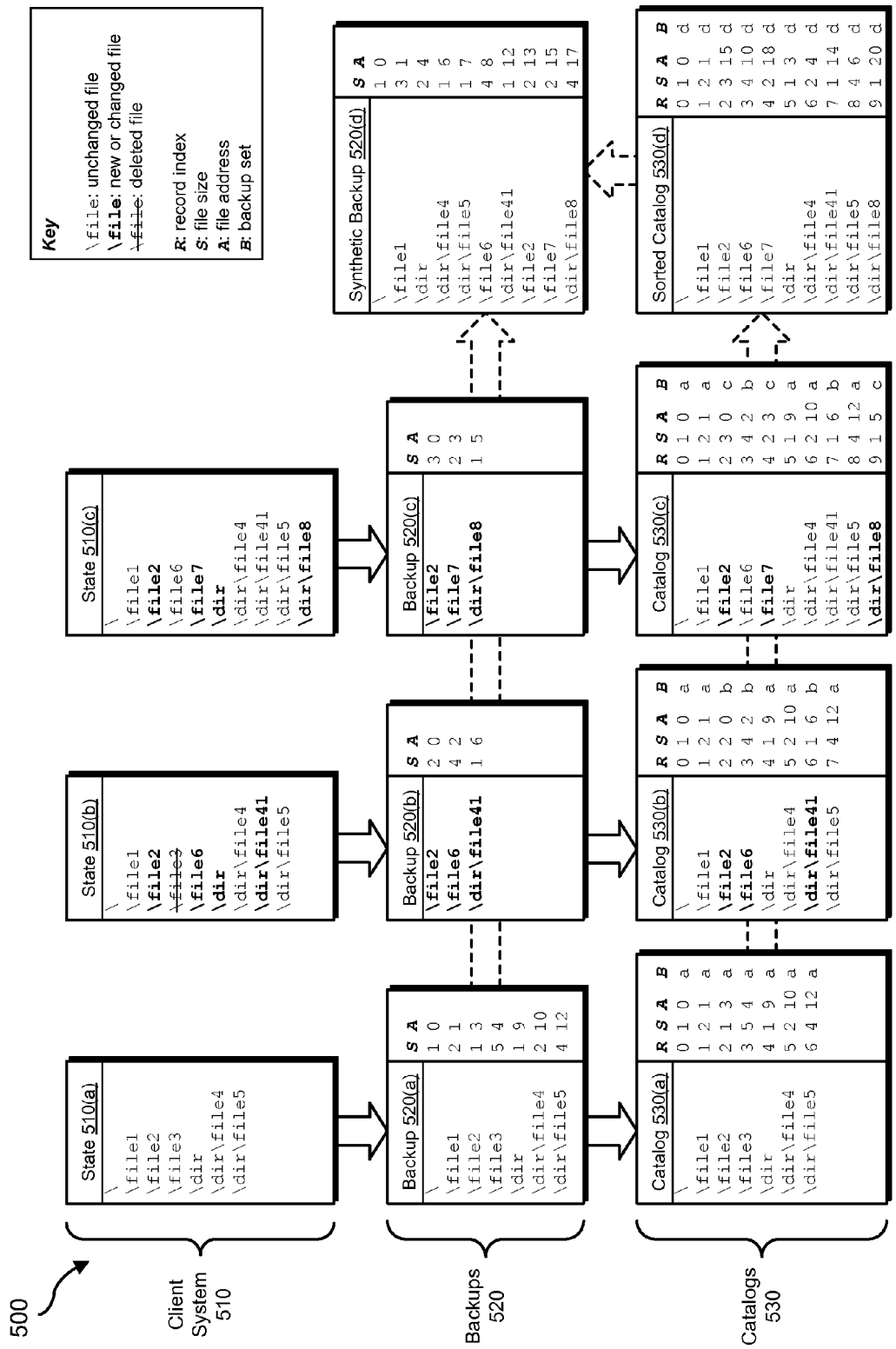
FIG. 5 is a block diagram of an exemplary synthetic backup process.

FIG. 5 illustrates an exemplary synthetic backup process 500. As shown in FIG. 5, catalogs 530 (representing states 510(a)-(c) of a client system 510 at backups 520) may progressively update at each incremental backup. For example, a catalog 530(b) may incorporate changes represented by a backup 520(b) into a catalog 530(a). The catalogs 530 may accordingly contain an indicator for each indexed file showing which to backup each indexed file corresponds. For example, catalog 530(b) may show all files corresponding to backup 520(a) except for "\file2", "\file6", and "\dir\file41", which may correspond instead to backup 520(b). When a backup 520(c) represents a change to "\file2", a catalog 530(c) may show "\file2" as corresponding to backup 520(c), along with newly added files "\file7" and "\dir\file8". In this example, cataloguing module 106 may base sorted catalog 530(d) on catalog 530(c), adjusting the file addresses to reflect the target file addresses of the indexed files rather than the source file addresses.

In the above example, each of backups 520(a)-(c) may be stored on a separate storage device. Backup module 108 may accordingly read from each storage device in turn (e.g., reading files needed from backup 520(a), then backup 520(b), then backup 520(c)). For example, backup module 108 may read (and copy) the following files and directories from backup 520(a) in order:

\
\file1
\dir
\dir\file4
\dir\file5 backup module 108 may then read and copy the following files from backup 520(b) in order:

\file6
\dir\file41 backup module 108 may then read and copy the following files from backup 520(c) in order:

\file2
\file7
\file8 after which backup module 108 will have copied all files and directories needed to create the synthetic backup 520(d) representing state 510(c) of client system 510.

In some examples, one or more of the modules described herein may generate a logical block address extent list for each catalog. In these examples, one or more of the modules described herein may walk through the entire tree of each selected directory in the given catalog instead of just the selected directory. In certain examples, one or more of the modules described herein may receive a file restore query. In these examples, one or more of the modules described herein may return a list of files from a catalog sorted in logical block address order.

By creating a sorted catalog of files, systems and methods described herein may prepare subsequent synthetic backups more efficiently. Furthermore, by reading the files in an order based on the locations of the files (e.g., by reading the files in sequential order from each storage device), systems and methods described herein may create the synthetic backup from backups stored on sequential storage devices and/or may perform the synthetic backup more efficiently (e.g., by reducing costly seek operations). This may also reduce wear on certain sequential storage devices (e.g., tapes in tape drives) and make the use of sequential storage devices practical.

The systems and methods described herein may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 6:
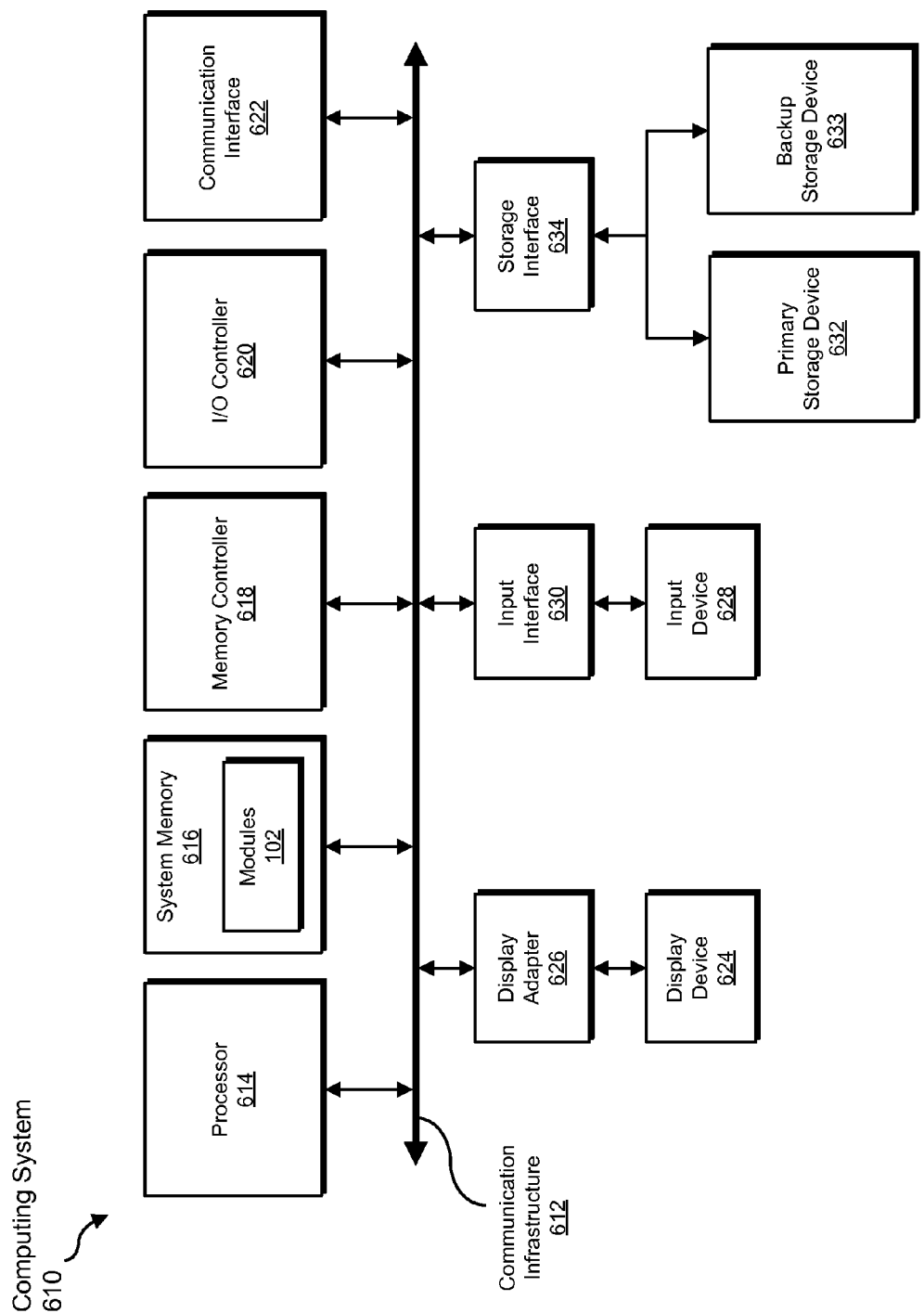
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, generating, indexing, creating, reading, grouping, and/or ordering steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, generating, indexing, creating, reading, grouping, and/or ordering.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, generating, indexing, creating, reading, grouping, and/or ordering steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, generating, indexing, creating, reading, grouping, and/or ordering steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, generating, indexing, creating, reading, grouping, and/or ordering steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, generating, indexing, creating, reading, grouping, and/or ordering steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
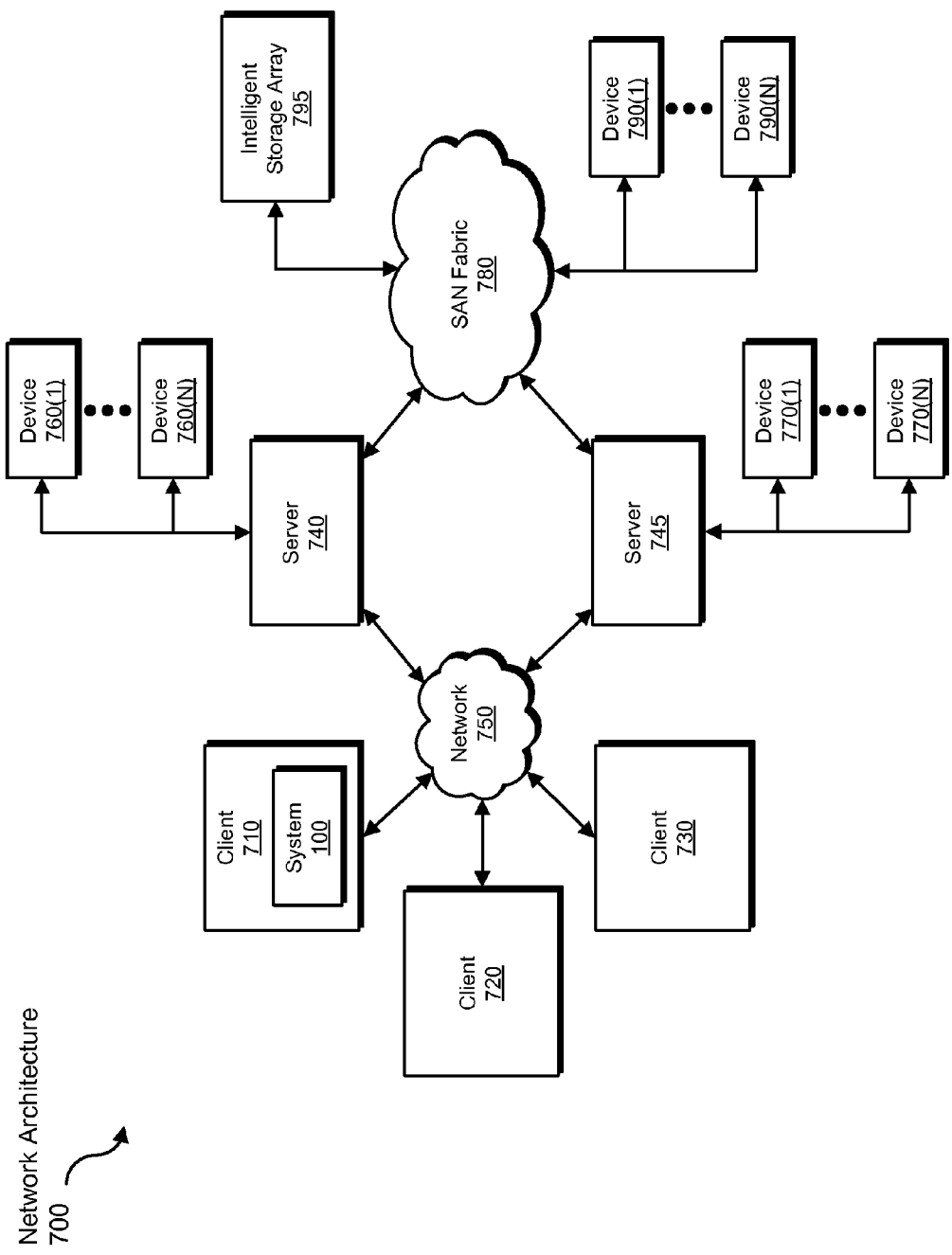
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, generating, indexing, creating, reading, grouping, and/or ordering steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for synthetic backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a device for efficiently synthesizing full backups. As another example, one or more of the modules described herein may transform a full backup and a set of incremental backups into a synthesized backup.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for synthetic backups, at least a portion of the method being performed by a computing device comprising at least one processor, the method comprising:
   identifying a full backup of a volume of files;
   identifying a set of incremental backups that were performed subsequently to the full backup;
   identifying a set of storage devices that store the full backup and the set of incremental backups;
   identifying a request to create a synthetic backup incorporating the full backup and the set of incremental backups;
   generating a sorted catalog for the synthetic backup by indexing files for the synthetic backup in a first order based on at least one characteristic of the files;
   creating the synthetic backup of the indexed files in the sorted catalog by reading the indexed files in a second order based on locations of the indexed files on the set of storage devices, wherein
   the first order of the files in the sorted catalog of the synthetic backup differs from the second order of the files in the synthetic backup.

2. The computer-implemented method of claim 1, wherein the characteristic of the files is sufficient to determine a well-ordering of the files such that a bijective mapping maps the characteristic of each file to a position in the first order based on the well-ordering of the files.

3. The computer-implemented method of claim 1, wherein reading the indexed files in the second order based on locations of the indexed files on the set of storage devices comprises grouping reads of the indexed files by storage device.

4. The computer-implemented method of claim 1, wherein reading the indexed files in the second order based on locations of the indexed files on the set of storage devices comprises ordering reads of indexed files stored on a sequential access device in a sequential access order.

5. The computer-implemented method of claim 1, wherein indexing the files for the synthetic backup in the first order based on at least one characteristic of the files comprises indexing the files for the synthetic backup in a lexicographical order.

6. The computer-implemented method of claim 1, wherein indexing the files for the synthetic backup in the first order based on at least one characteristic of the files comprises indexing the files for the synthetic backup in an order used by a file system of the volume of files.

7. The computer-implemented method of claim 1, wherein the full backup comprises a previous synthetic backup.

8. The computer-implemented method of claim 1, wherein identifying the full backup comprises identifying a sorted catalog of files in the full backup.

9. The computer-implemented method of claim 1, wherein identifying the set of incremental backups comprises identifying a sorted catalog of files for each incremental backup in the set of incremental backups.

10. The computer-implemented method of claim 1, wherein generating the sorted catalog for the synthetic backup by indexing files for the synthetic backup comprises indexing the files for the synthetic backup in the first order independent from the second order in which the indexed files are to be stored in the synthetic backup.

11. The computer-implemented method of claim 1, wherein the set of storage devices comprises at least one sequential access storage device.

12. A system for synthetic backups, the system comprising:
an identification module programmed to:
  identify a full backup of a volume of files;
  identify a set of incremental backups that were performed subsequently to the full backup;
  identify a set of storage devices that store the full backup and the set of incremental backups;
  identify a request to create a synthetic backup incorporating the full backup and the set of incremental backups;
a cataloguing module programmed to generate a sorted catalog for the synthetic backup by indexing files for the synthetic backup in a first order based on at least one characteristic of the files;
a backup module programmed to create the synthetic backup of the indexed files in the sorted catalog by reading the indexed files in a second order based on locations of the indexed files on the set of storage devices;
at least one processor configured to execute the identification module, the cataloguing module, and the backup module, wherein
the first order of the files in the sorted catalog of the synthetic backup differs from the second order of the files in the synthetic backup.

13. The system of claim 12, wherein the characteristic of the files is sufficient to determine a well-ordering of the files.

14. The system of claim 12, wherein the backup module is programmed to read the indexed files in the second order based on locations of the indexed files on the set of storage devices by grouping reads of the indexed files by storage device.

15. The system of claim 12, wherein the backup module is programmed to read the indexed files in the second order based on locations of the indexed files on the set of storage devices by ordering reads of indexed files stored on a sequential access device in a sequential access order.

16. The system of claim 12, wherein the cataloguing module is programmed to index the files for the synthetic backup in the first order based on at least one characteristic of the files by indexing the files for the synthetic backup in a lexicographical order.

17. The system of claim 12, wherein the cataloguing module is programmed to index the files for the synthetic backup in the first order based on at least one characteristic of the files by indexing the files for the synthetic backup in an order used by a file system of the volume of files.

18. The system of claim 12, wherein the full backup comprises a previous synthetic backup.

19. The system of claim 12, wherein the identification module is programmed to identify the full backup by identifying a sorted catalog of files in the full backup.

20. A non-transitory computer-readable-storage medium comprising one or more computer-executable instructions that, when executed by at least one processor of a computing device, cause the computing device to:
identify a full backup of a volume of files;
identify a set of incremental backups that were performed subsequently to the full backup;
identify a set of storage devices that store the full backup and the set of incremental backups;
identify a request to create a synthetic backup incorporating the full backup and the set of incremental backups;
generate a sorted catalog for the synthetic backup by indexing files for the synthetic backup in a first order based on at least one characteristic of the files;
create the synthetic backup of the indexed files in the sorted catalog by reading the indexed files in a second order based on locations of the indexed files on the set of storage devices, wherein
the first order of the files in the sorted catalog of the synthetic backup differs from the second order of the files in the synthetic backup.

* * * * *